(12) United States Patent
Arnold et al.

(10) Patent No.: US 9,096,972 B2
(45) Date of Patent: Aug. 4, 2015

(54) DISPERSE DYE MIXTURES, THEIR PREPARATION AND USE

(75) Inventors: Markus Arnold, Hattersheim (DE); Andrian Murgatroyd, Frankfurt am Main (DE); Clemens Grund, Hattersheim (DE); Gunter Görlitz, Bad Soden (DE); Timo Liebig, Köln (DE)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 13/979,756

(22) PCT Filed: Jan. 7, 2012

(86) PCT No.: PCT/EP2012/000049
§ 371 (c)(1),
(2), (4) Date: Jan. 21, 2014

(87) PCT Pub. No.: WO2012/095284
PCT Pub. Date: Jul. 19, 2012

(65) Prior Publication Data
US 2014/0123407 A1    May 8, 2014

(30) Foreign Application Priority Data
Jan. 15, 2011    (DE) .................. 10 2011 008 683

(51) Int. Cl.
| | | |
|---|---|---|
| *D06P 3/00* | (2006.01) | |
| *D06P 1/18* | (2006.01) | |
| *D06P 1/19* | (2006.01) | |
| *C09B 67/36* | (2006.01) | |
| *C09B 67/38* | (2006.01) | |
| *C09B 67/22* | (2006.01) | |
| *C09B 67/40* | (2006.01) | |
| *D06P 3/54* | (2006.01) | |
| *D06P 5/30* | (2006.01) | |

(52) U.S. Cl.
CPC .............. *D06P 1/18* (2013.01); *C09B 67/0051* (2013.01); *C09B 67/0082* (2013.01); *D06P 3/54* (2013.01); *D06P 5/30* (2013.01)

(58) Field of Classification Search
CPC .............. D06P 1/00; D06P 1/04; D06P 3/04; D06P 3/24; D06P 3/40; D06P 3/42; D06P 3/52; D06P 5/30; D06P 1/18; D06P 3/54; C09B 67/36; C09B 67/38; C09B 67/0051; C09B 67/0082; C09D 11/00; C09D 11/02
USPC ............ 8/636, 638, 639, 662, 667, 670, 696, 8/922, 921, 924; 106/31.13, 31.27; 347/1, 100
See application file for complete search history.

(56) References Cited

U.S. PATENT DOCUMENTS

| | | | |
|---|---|---|---|
| 4,152,511 A | 5/1979 | Bier et al. | |
| 5,038,415 A * | 8/1991 | Ueda et al. | .................. 8/639 |
| 6,682,573 B2 * | 1/2004 | Brierley et al. | .................. 8/639 |
| 2009/0123711 A1 | 5/2009 | Sieber | |
| 2010/0076182 A1 | 3/2010 | Jordan et al. | |
| 2010/0092670 A1 * | 4/2010 | Jordan et al. | .................. 427/256 |

FOREIGN PATENT DOCUMENTS

| | | | |
|---|---|---|---|
| DE | 2612842 A1 | 10/1977 | |
| GB | 909843 A | 11/1962 | |
| WO | WO-2005/056690 A1 | 6/2005 | |

(Continued)

OTHER PUBLICATIONS

International Search Report for PCT/EP2012/000049 mailed Jul. 5, 2012.

*Primary Examiner* — Amina Khan
(74) *Attorney, Agent, or Firm* — Drinker Biddle & Reath LLP

(57) ABSTRACT

The present invention relates to dye mixtures containing at least one dye of formula (I) and at least either a dye of formula (II) and/or at least one dye of formula (III) where $R^1$-$R^{15}$, n, o, X and $D^1$-$D^3$ are each as defined in claim 1. These dye mixtures are useful for dyeing or printing hydrophobic materials in particular.

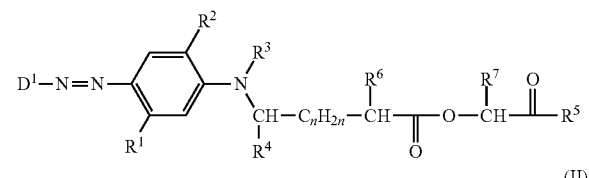

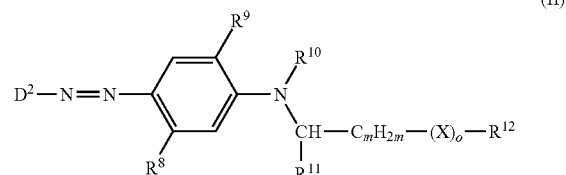

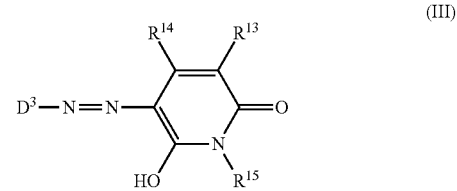

8 Claims, No Drawings

(56) References Cited

FOREIGN PATENT DOCUMENTS

| WO | WO2008/049758 | * | 5/2008 |
| WO | WO-2008049758 | A2 | 5/2008 |
| WO | WO-2008090042 | A1 | 7/2008 |
| WO | WO-2009037215 | A2 | 3/2009 |

* cited by examiner

DISPERSE DYE MIXTURES, THEIR PREPARATION AND USE

CROSS-REFERENCE TO RELATED APPLICATIONS

This application is a national stage application (under 35 U.S.C. §371) of PCT/EP2012/000049, filed Jan. 7, 2012, which claims benefit of German application 10 2011 008 683.8, filed Jan. 15, 2011 which are both incorporated by reference.

The present invention relates to the field of disperse dyes for dyeing hydrophobic textile materials.

Disperse azo dyes in which the chromophore is linked to 2-oxoalkylketo groups are known and described for example in WO 2009/037215 A2, WO 2008/090042 A1, WO 2008/049758 A2, WO2005/056690 A1, as well as GB 909843 A and DE 26 12 742 A1. None of these documents describes dye mixtures. WO 95/20014 A1 discloses a dyeing process wherein dye mixtures can be used. Azo dyes with an —$SO_2F$ group are concerned, and they can be used as dye mixtures or in admixture with dyes without an —$SO_2F$ group. Possible candidates mentioned include azo dyes in which the chromophore is linked to 2-oxoalkylketo groups.

It has now been found that the hereinbelow defined mixtures of 2-oxoalkylketo-containing disperse azo dyes with further selected disperse azo dyes are distinctly superior to the individual dyes in respect of the wash and contact fastnesses and the sublimation fastness of dyeings on polyester and polyester-elastane materials.

The present invention provides dye mixtures containing at least one dye of formula (I)

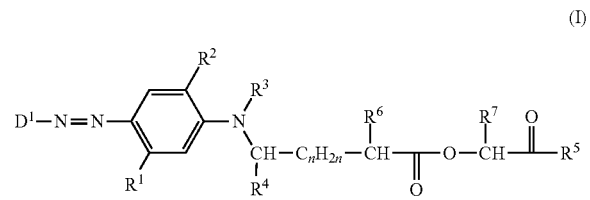

(I)

where
$R^1$ is hydrogen, $(C_1-C_6)$-alkyl, $(C_1-C_4)$-alkoxy, hydroxyl, halogen, —NHCHO, —NHCO$(C_1-C_6)$-alkyl, —NHCO-aryl, —NHSO$_2(C_1-C_6)$-alkyl or —NHSO$_2$-aryl,
$R^2$ is hydrogen, halogen, $(C_1-C_4)$-alkoxy, $(C_1-C_4)$-alkyl or aryloxy,
$R^3$ is hydrogen, $(C_1-C_6)$-alkyl, substituted $(C_1-C_6)$-alkyl, $(C_3-C_4)$-alkenyl or substituted $(C_3-C_4)$-alkenyl, especially benzyl, butyl, 2-cyanoethyl or a moiety of formula —CHR$^4$—C$_n$H$_{2n}$—, —CHR$^6$—COO—CHR$^7$—CO—R$^5$, or $R^2$ and $R^3$ combine to form the moiety —C*H(CH$_3$)CH$_2$C(CH$_3$)$_2$—, where the carbon atom marked * is attached to the phenyl nucleus,
$R^4$ is hydrogen, $(C_1-C_6)$-alkyl or phenyl,
$R^5$ is $(C_1-C_6)$-alkyl or substituted $(C_1-C_6)$-alkyl,
$R^6$ is hydrogen or $(C_1-C_6)$-alkyl,
$R^7$ is hydrogen, $(C_1-C_6)$-alkyl or phenyl, and
n is 0, 1, 2 or 3, and at least one dye of formula (II)

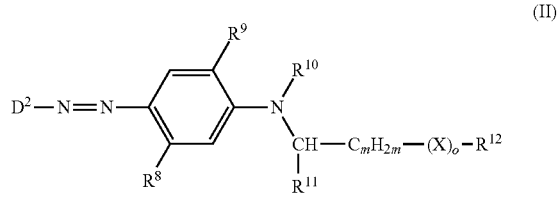

(II)

where
$R^8$ is hydrogen, $(C_1-C_6)$-alkyl, $(C_1-C_4)$-alkoxy, hydroxyl, halogen, —NHCHO, —NHCO$(C_1-C_6)$-alkyl, —NHCO-aryl, —NHSO$_2(C_1-C_6)$-alkyl or —NHSO$_2$-aryl,
$R^9$ is hydrogen, halogen, $(C_1-C_4)$-alkoxy, $(C_1-C_4)$-alkyl or aryloxy,
$R^{10}$ is hydrogen, $(C_1-C_6)$-alkyl, substituted $(C_1-C_6)$-alkyl, $(C_3-C_4)$-alkenyl or substituted $(C_3-C_4)$-alkenyl, especially a moiety of formula —CHR$^{11}$—C$_m$H$_{2m}$—(X)$_o$—R$^{12}$, or $R^9$ and $R^{10}$ combine to form the moiety —C*H(CH$_3$)CH$_2$C(CH$_3$)$_2$—, where the carbon atom marked * is attached to the phenyl nucleus,
$R^{11}$ is hydrogen, $(C_1-C_6)$-alkyl or phenyl,
$R^{12}$ is hydrogen, $(C_1-C_6)$-alkyl, substituted $(C_1-C_6)$-alkyl, $(C_3-C_4)$-alkenyl or substituted $(C_3-C_4)$-alkenyl,
X is —CO—O—, —O—CO—, —O—, —NH— or —S—,
o is 0 or 1,
m is 0, 1, 2 or 3, and
$D^1$ and $D^2$ are the same or different and they each represent the residue of a diazo component,
and/or at least one dye of formula (III)

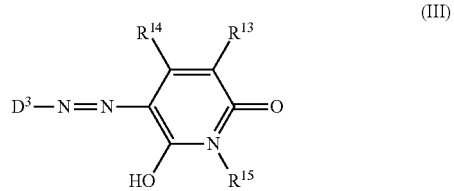

(III)

where
$R^{13}$ is hydrogen, cyano or carboxamido,
$R^{14}$ is methyl, ethyl or phenyl,
$R^{15}$ is optionally substituted $(C_1-C_6)$-alkyl or optionally substituted oxygen-interrupted $(C_2-C_6)$-alkyl, and
$D^3$ represents the residue of a diazo component.

Residues $D^1$, $D^2$ and $D^3$ of a diazo component are more particularly the moieties customary in the field of disperse dyes and known to one skilled in the art.

Preferably, $D^1$, $D^2$ and $D^3$ each independently represent a group of formula (IVa)

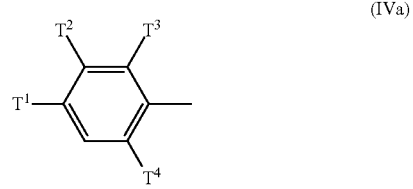

(IVa)

where $T^1$ and $T^2$ are each independently hydrogen, $(C_1\text{-}C_6)$-alkyl, $(C_1\text{-}C_4)$-alkoxy, —$SO_2(C_1\text{-}C_6)$-alkyl, —$SO_2$-aryl, cyano, halogen or nitro, or $T^1$ and $T^2$ combine to form the moiety —$CONT^{14}CO$—, $T^{14}$ hydrogen or $(C_1\text{-}C_6)$-alkyl, and $T^3$ and $T^4$ are each independently hydrogen, halogen, trifluoromethyl, cyano, —SCN, —$SO_2CH_3$ or nitro, provided at least one of $T^1$, $T^2$, $T^3$ and $T^4$ is not hydrogen;

or represent a group of formula (IVb)

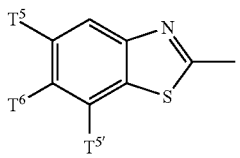

(IVb)

where $T^5$ and $T^{5'}$ are each independently hydrogen or halogen, and $T^6$ is hydrogen, —$SO_2CH_3$, —SCN, $(C_1\text{-}C_4)$-alkoxy, halogen or nitro, provided at least one of $T^5$, $T^{5'}$ and $T^6$ is not hydrogen;

or represent a group of formula (IVc)

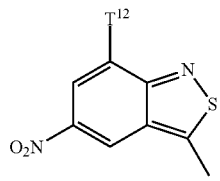

(IVc)

where $T^{12}$ is hydrogen or halogen;

or represent a group of formula (IVd)

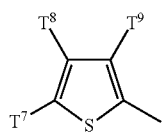

(IVd)

where $T^7$ is nitro, —CHO, cyano, —$COCH_3$ or either a group of formula (IVda)

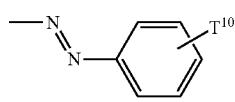

(IVda)

where $T^{10}$ is hydrogen, halogen, nitro or cyano, or a group of formula (IVdb)

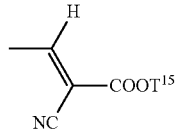

(IVdb)

where $T^{15}$ is $(C_1\text{-}C_6)$-alkyl, $T^8$ is hydrogen, $(C_1\text{-}C_6$-alkyl) or halogen, and $T^9$ is nitro, cyano, —$COCH_3$ or $COOT^{11}$, where $T^{11}$ is $(C_1\text{-}C_4)$-alkyl;

or represent a group of formula (IVe)

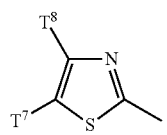

(IVe)

where $T^7$ and $T^8$ are each as defined above;

or represent a group of formula (IVf)

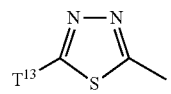

(IVf)

where $T^{13}$ is phenyl or —S—$(C_1\text{-}C_4)$-alkyl.

Alkyl groups may be straight-chain or branched in the context of the present invention. $C_1\text{-}C_6$-Alkyl is for example methyl, ethyl, n-propyl, i-propyl, n-butyl, i-butyl, tert-butyl, n-pentyl or n-hexyl. Analogous considerations apply to alkoxy groups, which are methoxy or ethoxy for example.

Substituents on $C_1\text{-}C_6$-alkyl groups can be monovalent hydrocarbyl radicals or cyano, thiocyanato, nitro, hydroxyl, alkoxy, carboxyl, sulfonic acid, carboxylic ester, carboxamide or amino groups as well as halogen atoms. Monovalent hydrocarbyl radicals include alkyl, cycloalkyl, aryl or heterocyclyl radicals.

$(C_3\text{-}C_4)$-Alkenyl groups are in particular allyl.

Substituents for $(C_3\text{-}C_4)$-alkenyl are for example halogen and phenyl.

Aryl is in particular phenyl or naphthyl. Aryloxy is in particular naphthyloxy or phenyloxy. Substituents for aryl or aryloxy are for example halogen, methyl, ethyl, hydroxyethyl, methoxy, ethoxy, hydroxyl, nitro and cyano.

—$NHSO_2$-Aryl is in particular phenylsulfonylamino.

Halogen is fluorine, chlorine, bromine or iodine, preferably chlorine or bromine.

$R^1$ is preferably hydrogen, methyl, ethyl, n-propyl, sec-propyl, n-butyl, sec-butyl, methoxy, ethoxy, hydroxyl, chlorine, bromine, —NHCHO, —NHCO-methyl, —NHCO-phenyl, —$NHSO_2$-methyl or —$NHSO_2$-phenyl. Very particularly preferred $R^1$ radicals are hydrogen, —NHCO-methyl, methyl and hydroxyl.

$R^2$ is preferably hydrogen, chlorine, bromine, methoxy, ethoxy, methyl, ethyl, n-propyl, sec-propyl, n-butyl, sec-butyl or phenoxy. Very particularly preferred $R^2$ radicals are hydrogen and methoxy.

$R^3$ is preferably hydrogen, methyl, ethyl, n-propyl, sec-propyl, n-butyl, sec-butyl, 2-cyanoethyl, vinyl, allyl, benzyl or a radical of formula —$CHR^4$—$C_nH_2$, —$CHR^6$—COO—$CHR^7$—CO—$R^5$. Very particularly preferred $R^3$ radicals are hydrogen, benzyl, 2-cyanoethyl, methyl, ethyl, n-propyl, n-butyl and —$C_2H_4$—COO—$CH_2$—CO—$CH_3$.

$R^4$ is preferably hydrogen, methyl, ethyl, n-propyl, sec-propyl, n-butyl, sec-butyl or phenyl. Very particularly preferred $R^4$ radicals are hydrogen and methyl.

$R^5$ is preferably methyl, ethyl, n-propyl, isopropyl, n-butyl, sec-butyl or substituted ($C_1$-$C_6$)-alkyl, such as 2-cyanoethyl or cyanomethyl. Methyl is a very particularly preferred $R^5$ radical.

$R^6$ is preferably hydrogen, methyl or ethyl. Hydrogen is a very particularly preferred $R^6$ radical.

$R^7$ is preferably hydrogen, methyl, ethyl or phenyl. Very particularly preferred $R^7$ radicals are hydrogen and methyl.

$R^8$ is preferably hydrogen, methyl, ethyl, n-propyl, sec-propyl, n-butyl, sec-butyl, methoxy, ethoxy, hydroxyl, chlorine, bromine, —NHCHO, —NHCO-methyl, —NHCO-phenyl, —NHSO$_2$-methyl or —NHSO$_2$-phenyl. Very particularly preferred $R^8$ radicals are hydrogen, methyl, —NHCO-methyl and hydroxyl.

$R^9$ is preferably hydrogen, chlorine, bromine, methoxy, ethoxy, methyl, ethyl, n-propyl, sec-propyl, n-butyl, sec-butyl or phenoxy. Very particularly preferred $R^9$ radicals are hydrogen, chlorine, methoxy and methyl.

$R^{10}$ is preferably hydrogen, methyl, ethyl, n-propyl, sec-propyl, n-butyl, sec-butyl, vinyl, allyl, benzyl or a radical of formula —$CHR^{11}$—$C_mH_{2m}$—(X)$_o$—$R^{12}$, where $R^{11}$, $R^{12}$, X, m and o are each as defined above. Very particularly preferred $R^{10}$ radicals are hydrogen, methyl, ethyl, benzyl, —$C_xH_{2x}$—O—$CH_3$ where x=1 or 2, —$C_xH_{2x}$—COO—$C_2H_5$ where x=1 or 2, —$C_xH_{2x}$—COO—$CH_3$ where x=1 or 2, —$C_xH_{2x}$—OCO—$C_2H_5$ where x=1 or 2 and —$C_xH_{2x}$—OCO—$CH_3$ where x=1 or 2.

$R^{11}$ is preferably hydrogen, methyl, ethyl, n-propyl, sec-propyl, n-butyl, sec-butyl or phenyl. Very particularly preferred $R^{11}$ radicals are hydrogen or methyl.

$R^{12}$ is preferably hydrogen, methyl, ethyl, n-propyl, sec-propyl, n-butyl, sec-butyl, benzyl, vinyl, allyl, 2-(N-phthalimidoyl)ethyl, cyanomethyl, 2-cyanoethyl or radicals of formula —$C_qH_{2q}$—Y—$C_rH_{2r}$—(Z)$_o$—$R^{13}$, where q is 1, 2, 3 or 4, r is 1, 2, 3 or 4, o is 0 or 1, Y is —CO—, —COO— or —OCO—, Z is —COO— or —COO— and $R^{13}$ is ($C_1$-$C_6$)-alkyl, phenyl, halogen, cyano or heterocyclyl, especially N-phthalimidoyl. Very particularly preferred $R^{12}$ radicals are methyl, ethyl, 2-(N-phthalimidoyl)ethyl, cyanomethyl, 2-cyanoethyl,
—$C_xH_{2x}$—OCO—$CH_3$ where x=1 or 2, —$C_xH_{2x}$—OCO—$C_2H_5$ where x=1 or 2,
—$C_xH_{2x}$—COO—$CH_3$ where x=1 or 2, —$C_xH_{2x}$—COO—$C_2H_5$ where x=1 or 2,
—$C_xH_{2x}$—OCO—$C_yH_{2y}$—(N-phthalimidoyl) where x and y are each independently=1 or 2, more preferably x=1 and y=2,
—$C_xH_{2x}$—COO—$C_yH_{2y}$—(N-phthalimidoyl) where x and y are each independently=1 or 2, more preferably x=1 and y=2,
—$C_xH_{2x}$—COO—$C_yN_{2y}$—OCO—$CH_{2z}$—$C_6H_5$ where x, y and z are each independently=1 or 2, more preferably x, y and z are each 1.

X is preferably —CO—O—, —O—CO— or —O—.

$R^{13}$ is preferably cyano.

$R^{14}$ is preferably ethyl or more particularly methyl.

$R^{15}$ is preferably methyl, ethyl, n-propyl, sec-propyl, n-butyl, sec-butyl, 1-ethylpentyl, methoxymethyl, methoxyethyl, ethoxymethyl, ethoxyethyl, —$C_yH_{2y}$—COO—$CH_2$—CO—$C_6H_5$ where y=1, 2, 3 or 4 or —$C_yH_{2y}$—O—($C_1$-$C_4$-alkyl) where y=1, 2, 3 or 4.

The index m is preferably 0 or 1.
The index n is preferably 0 or 1.
The index o is preferably 1.

It is particularly preferable for the dye mixtures according to the present invention to utilize compounds of formula I where
$R^1$ is hydrogen, —NHCO-methyl, methyl or hydroxyl,
$R^2$ is hydrogen or methoxy,
$R^3$ is hydrogen, benzyl, 2-cyanoethyl, methyl, ethyl, n-propyl, n-butyl or —$C_2H_4$—COO—$CH_2$—CO—$CH_3$,
$R^4$ is hydrogen or methyl,
$R^5$ is methyl,
$R^6$ is hydrogen,
$R^7$ is hydrogen or methyl, and
n is 0 or 1.

It is particularly preferable for the dye mixtures according to the present invention to utilize compounds of formula II where
$R^8$ is hydrogen, methyl, —NHCO-methyl or hydroxyl,
$R^9$ is hydrogen, chlorine, methoxy or methyl,
$R^{10}$ is hydrogen, methyl, ethyl, benzyl, —$C_xH_{2x}$—O—$CH_3$ where x=1 or 2,
—$C_xH_{2x}$—COO—$C_2H_5$ where x=1 or 2, —$C_xH_{2x}$—COO—$CH_3$ where x=1 or 2,
—$C_xH_{2x}$—OCO—$C_2H_5$ where x=1 or 2 and —$C_xH_{2x}$—OCO—$CH_3$ where x=1 or 2,
$R^{11}$ is hydrogen or methyl,
$R^{12}$ is methyl, ethyl, 2-(N-phthalimidoyl)ethyl, cyanomethyl, 2-cyanoethyl,
—$C_xH_{2x}$—OCO—$CH_3$ where x=1 or 2, —$C_xH_{2x}$—OCO—$C_2H_5$ where x=1 or 2,
—$C_xH_{2x}$—COO—$CH_3$ where x=1 or 2, —$C_xH_{2x}$—COO—$C_2H_6$ where x=1 or 2,
—$C_xH_{2x}$—OCO—$C_yH_{2y}$—(N-phthalimidoyl) where x and y are each independently=1 or 2, more preferably x=1 and y=2,
—$C_xH_{2x}$—COO—$C_yH_{2y}$—(N-phthalimidoyl) where x and y are each independently=1 or 2, more preferably x=1 and y=2,
—$C_xH_{2x}$—COO—$C_yH_{2y}$—OCO—$C_zH_{2z}$—$C_6H_5$ where x, y and z are each independently=1 or 2, more preferably x, y and z is 1,
X is —CO—O—, —O—CO— or —O—, and
m is 0 or 1.

It is particularly preferable for the dye mixtures according to the present invention to utilize compounds of formula III where
$R^{13}$ is cyano,
$R^{14}$ is ethyl or methyl, and
$R^{15}$ is methyl, ethyl, n-propyl, sec-propyl, n-butyl, sec-butyl, 1-ethylpentyl, methoxymethyl, methoxyethyl, ethoxymethyl, ethoxyethyl, —$C_yH_{2y}$—COO—$CH_2$—CO—$C_6H_5$ where y=1, 2, 3 or 4 or —$C_yH_{2y}$—O—($C_1$-$C_4$-alkyl) where y=1, 2, 3 or 4.

Preferred dye mixtures according to the present invention contain at least one dye of formula (I) where $D^1$ is a group of formula (IVa) in which
$T^1$ is nitro,
$T^2$ is hydrogen or chlorine,
$T^3$ is hydrogen, chlorine, bromine, trifluoromethyl, cyano or nitro,
$T^4$ is hydrogen, chlorine, bromine, trifluoromethyl, cyano or nitro, $R^1$ is hydrogen, chlorine, methyl, acetylamino, propionylamino, benzoylamino; methylsulfonylamino, ethylsulfonylamino or phenylsulfonylamino, $R^2$ is hydrogen or chlorine, $R^3$ is hydrogen, methyl, ethyl, propyl, butyl, benzyl, phenylethyl, phenoxyethyl, methoxyethyl, cyanoethyl or allyl, $R^4$, $R^6$ and $R^7$ are hydrogen, $R^5$ is methyl, and n is 0 or 1.

Particularly preferred dye mixtures according to the present invention contain at least one dye of formula (I) where $D^1$ is a group of formula (IVa) in which $T^1$ is nitro, $T^2$ is hydrogen or chlorine, $T^3$ is hydrogen, chlorine, bromine, trifluoromethyl, cyano or nitro, $T^4$ is hydrogen, chlorine, bromine, trifluoromethyl, cyano or nitro, $R^1$ is hydrogen, methyl or acetylamino, $R^2$ is hydrogen or chlorine, $R^3$ is hydrogen, methyl, ethyl, n-butyl, benzyl, phenylethyl, phenoxyethyl, cyanoethyl or allyl, $R^4$, $R^6$ and $R^7$ are hydrogen, $R^5$ is methyl, and n is 0.

Very particularly preferred dye mixtures according to the present invention contain at least one dye of formula (Ia)

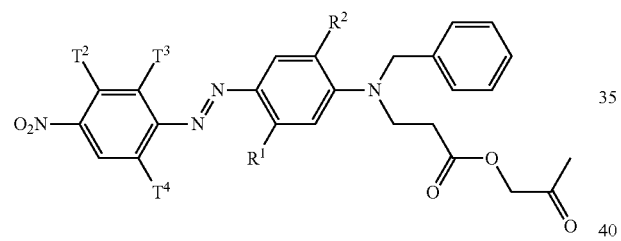

(Ia)

where $T^2$ is hydrogen or chlorine, $T^3$ is hydrogen, chlorine, bromine or cyano, $T^4$ is hydrogen, chlorine, bromine, cyano, nitro or trifluoromethyl, $R^1$ is hydrogen, —NHCOCH$_3$ or —NHSO$_2$CH$_3$, and $R^2$ is hydrogen or —OCH$_3$.

Further preferred dye mixtures according to the present invention contain at least one dye of formula (IIa)

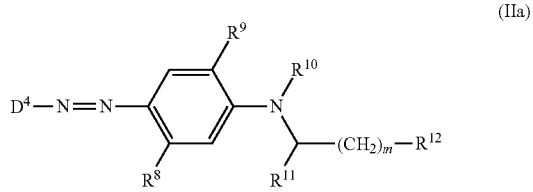

(IIa)

where $R^8$ is hydrogen, $(C_1\text{-}C_6)$-alkyl, $(C_1\text{-}C_4)$-alkoxy, hydroxyl, halogen, —NHCHO, —NHCO($C_1$-$C_6$)-alkyl, —NHCO-aryl, —NHSO$_2$($C_1$-$C_6$)-alkyl or —NHSO$_2$-aryl, $R^9$ is hydrogen, halogen, $(C_1\text{-}C_4)$-alkoxy, $(C_1\text{-}C_4)$-alkyl or phenoxy, $R^{10}$ is hydrogen, $(C_1\text{-}C_6)$-alkyl, substituted $(C_1\text{-}C_6)$-alkyl, $(C_3\text{-}C_4)$-alkenyl or substituted $(C_3\text{-}C_4)$-alkenyl, or $R^9$ and $R^{10}$ combine to form the moiety —C*H(CH$_3$)CH$_2$C(CH$_3$)$_2$—, where the carbon atom marked * is attached to the phenyl nucleus, $R^{11}$ is hydrogen, $(C_1\text{-}C_6)$-alkyl or phenyl, $R^{12}$ is hydrogen, $(C_1\text{-}C_6)$-alkyl, substituted $(C_1\text{-}C_6)$-alkyl, $(C_3\text{-}C_4)$-alkenyl or substituted $(C_3\text{-}C_4)$-alkenyl, m is 0, 1, 2 or 3, and where $D^4$ is a group of formula (IVa)

and/or a dye of formula (IIIa)

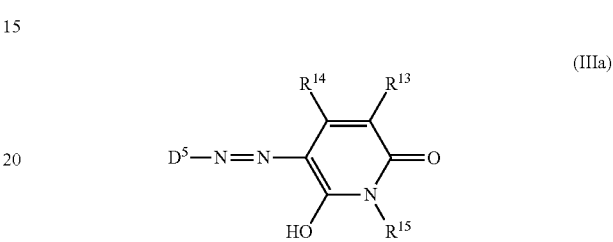

(IIIa)

where $R^{13}$ is hydrogen, cyano or carboxamido, $R^{14}$ is methyl, ethyl or phenyl, $R^{15}$ is optionally substituted $(C_1\text{-}C_6)$-alkyl or optionally substituted oxygen-interrupted $(C_2\text{-}C_6)$-alkyl, and $D^5$ is a group of formula (IVa).

Further very preferable dye mixtures according to the present invention contain at least one dye of formula (IIb)

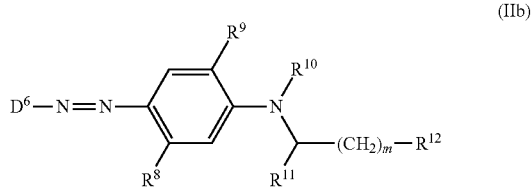

(IIb)

where $R^8$ is hydrogen, $(C_1\text{-}C_6)$-alkyl, $(C_1\text{-}C_4)$-alkoxy, hydroxyl, halogen, —NHCHO, —NHCO($C_1$-$C_6$)-alkyl, —NHCO-aryl, —NHSO$_2$($C_1$-$C_6$)-alkyl or —NHSO$_2$-aryl, $R^9$ is hydrogen, halogen, $(C_1\text{-}C_4)$-alkoxy, $(C_1\text{-}C_4)$-alkyl or phenoxy, $R^{10}$ is hydrogen, $(C_1\text{-}C_6)$-alkyl, substituted $(C_1\text{-}C_6)$-alkyl, $(C_3\text{-}C_4)$-alkenyl or substituted $(C_3\text{-}C_4)$-alkenyl, or $R^9$ and $R^{10}$ combine to form the moiety —C*H(CH$_3$)CH$_2$C(CH$_3$)$_2$—, where the carbon atom marked * is attached to the phenyl nucleus, $R^{11}$ is hydrogen, $(C_1\text{-}C_6)$-alkyl or phenyl, $R^{12}$ is hydrogen, $(C_1\text{-}C_6)$-alkyl, substituted $(C_1\text{-}C_6)$-alkyl, $(C_3\text{-}C_4)$-alkenyl or substituted $(C_3\text{-}C_4)$-alkenyl, m is 0, 1, 2 or 3, and $D^6$ is a group of formula (IVa), where $T^1$ is nitro;

and/or a dye of formula (IIIb)

$$\text{(IIIb)}$$

where
R$^{13}$ is hydrogen, cyano or carboxamido,
R$^{14}$ is methyl, ethyl or phenyl,
R$^{15}$ is optionally substituted (C$_1$-C$_6$)-alkyl or optionally substituted oxygen-interrupted (C$_2$-C$_6$)-alkyl, and
D$^7$ is a group of formula (IVa), where T$^1$ is nitro or —OCH$_3$.

Further very particularly preferred dye mixtures according to the present invention contain at least one dye of formula IIc $$\text{(IIc)}$$

where
R$^8$ is hydrogen, methyl, methoxy, ethoxy, hydroxyl, chlorine, bromine, —NHCOCH$_3$ or —NHCOCH$_2$CH$_3$,
R$^9$ is hydrogen, methyl, —OCH$_3$, —OCH$_2$CH$_3$, chlorine or bromine,
R$^{10}$ is hydrogen, (C$_1$-C$_6$)-alkyl or substituted (C$_1$-C$_6$)-alkyl,
R$^{11}$ is hydrogen, methyl or phenyl,
R$^{12}$ is hydrogen, (C$_1$-C$_6$)-alkyl or substituted (C$_1$-C$_6$)-alkyl,
m is 0, 1, 2 or 3, and
D$^8$ is a group of formula (IVa), where
T$^1$ is nitro,
T$^2$ is hydrogen,
T$^3$ is hydrogen, chlorine, bromine, nitro, cyano or hydroxyl, and
T$^4$ is hydrogen, chlorine, bromine, nitro or cyano;
and/or a dye of formula (IIIc)

$$\text{(IIIc)}$$

where
R$^{13}$ is hydrogen, cyano or carboxamido,
R$^{14}$ is methyl, ethyl or phenyl,
R$^{15}$ is optionally substituted (C$_1$-C$_6$)-alkyl, and
D$^9$ is a group of formula (IVa), where
T$^1$ is nitro or —OCH$_3$,
T$^2$ is hydrogen,
T$^3$ is hydrogen, chlorine, bromine, nitro or cyano or hydroxyl, and
T$^4$ is hydrogen, chlorine, bromine, nitro or cyano.

Particularly preferred dye mixtures according to the present invention contain at least one dye of formula (Ib)

$$\text{(Ib)}$$

where
T$^3$ is hydrogen, chlorine, bromine or cyano,
T$^4$ is cyano or nitro,
R$^1$ is hydrogen or —NHCOCH$_3$, and
R$^2$ is hydrogen or —OCH$_3$;
and also at least one dye of formula IId $$\text{(IId)}$$

where
R$^8$ is hydrogen, —NHCOCH$_3$ or —NHCOCH$_2$CH$_3$,
R$^9$ is hydrogen, —OCH$_3$ or —OCH$_2$CH$_5$,
R$^{10}$ is hydrogen, (C$_1$-C$_6$)-alkyl or substituted (C$_1$-C$_6$)-alkyl,
R$^{12}$ is hydrogen, (C$_1$-C$_6$)-alkyl or substituted (C$_1$-C$_6$)-alkyl,
and where
T$^3$ is hydrogen, chlorine, bromine, nitro, cyano or hydroxyl, and
T$^4$ is hydrogen, chlorine, bromine, nitro or cyano.

The dye mixtures according to the present invention contain the dyes of formula (I) in admixture with (II) or (III) more particularly in amounts each from 1% to 99% by weight, more preferably in amounts of in each case from 20% to 80% by weight. Very particularly preferred dye mixtures according to the present invention contain dyes of formula (I) in amounts from 30% to 60% by weight and dyes of formula (II) or (III) in amounts from 40% to 70% by weight. This also applies mutatis mutandis to mixtures containing dyes of formulae Ia, Ib or Ic or of formulae IIa, IIb, IIc or IId or of formulae IIIa, IIIb or IIIc, respectively.

Suitable mixing ratios for dye of formula (I):dye of formula (II) or of formula (III) are in the range from 90:10 to 10:90, more particularly 90:10, 80:20, 75:25, 70:30, 60:40, 55:45, 50:50, 45:55, 40:60, 30:70, 25:75, 20:80 and 10:90. This again also applies mutatis mutandis to mixtures containing dyes of formulae Ia, Ib or Ic or of formulae IIa, IIb, IIc or IId or of formulae IIIa, IIIb or IIIc, respectively.

The dye mixtures according to the present invention are obtainable by mechanically mixing the dyes of formula (I) with dyes of formulae (II) or (III). The amounts are more particularly chosen so as to produce mixtures having the desired compositions.

The dyes of formula (I) are known and are described for example in WO2008/049758.

The dye mixtures according to the present invention are outstandingly useful for dyeing and printing hydrophobic materials in that the dyeings and prints obtained are notable for level shades and high service fastnesses. Deserving of particular mention are outstanding wash and contact fastnesses and also good sublimation fastnesses, especially on polyester and polyester-elastane materials.

The present invention thus also provides for the use of the dye mixtures of the present invention for dyeing and printing hydrophobic materials, i.e., processes for dyeing or printing such materials in a conventional manner wherein a dye mixture according to the present invention is used as a colorant.

The hydrophobic materials mentioned can be of synthetic or semisynthetic origin. Examples include secondary cellulose acetate, cellulose triacetate, polyamides, polylactides and more particularly high molecular weight polyesters. Materials composed of high molecular weight polyester are more particularly those based on polyethylene terephthalates or polytrimethylene terephthalates. Blend fabrics and blend fibers such as for example polyester-cotton or polyester-elastane are also possible. The hydrophobic synthetic materials can be present in the form of self-supporting film/sheeting or fabric- or thread-shaped bodies and may for example have been processed into yarns or woven or knitted textile fabrics. Preference is given to fibrous textile materials, which may also be present in the form of microfibers for example.

The dyeing in accordance with the use provided by the present invention can be effected in a conventional manner, preferably from an aqueous dispersion, if appropriate in the presence of carriers, at between 80 to about 110° C. by the exhaust process or in a dyeing autoclave at 110 to 140° C. by the HT process, and also by the so-called thermofix process, in which the fabric is padded with the dyeing liquor and subsequently fixed/set at about 180 to 230° C.

Printing of the materials mentioned can be carried out in a manner known per se by incorporating the dye mixtures of the present invention in a print paste and treating the fabric printed therewith at temperatures between 180 to 230° C. with HT steam, high-pressure steam or dry heat, if appropriate in the presence of a carrier, to fix the dye.

The dye mixtures of the present invention shall be in a very fine state of subdivision when they are used in dyeing liquors, padded liquors or print pastes.

The dyes are converted into the fine state of subdivision in a conventional manner by slurrying them together with dispersants in a liquid medium, preferably water, and subjecting the mixture to the action of shearing forces to mechanically comminute the originally present dye particles to such an extent that an optimal specific surface area is achieved and sedimentation of the dye is minimized. This is accomplished in suitable mills, such as ball or sand mills. The particle size of the dyes is generally between 0.5 and 5 µm, and preferably equal to about 1 µm.

The dispersants used in the milling operation can be nonionic or anionic. Nonionic dispersants are for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained shall be pourable for most applications. Accordingly, the dye and dispersant content is limited in these cases. In general, the dispersions are adjusted to a dye content of up to 50 percent by weight and a dispersant content of up to about 25 percent by weight. For economic reasons, dye contents are in most cases not below 15 percent by weight.

The dispersions may also contain still further auxiliaries, for example those which act as an oxidizing agent, for example sodium m-nitrobenzenesulfonate, or fungicidal agents, for example sodium o-phenylphenoxide and sodium pentachlorophenoxide, and particularly so-called "acid donors", examples being butyrolactone, monochloroacetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders contain the dye, dispersants and other auxiliaries, for example wetting, oxidizing, preserving and dustproofing agents and the abovementioned "acid donors".

A preferred method of making pulverulent dye preparations consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that an appropriate liquor ratio of, for example, 1:5 to 1:50 is obtained for dyeing. In addition, it is generally customary to add further dyeing auxiliaries, such as dispersing, wetting and fixing auxiliaries, to the liquors. Organic and inorganic acids such as acetic acid, succinic acid, boric acid or phosphoric acid are added to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye mixture in textile printing, the requisite amounts of the abovementioned dye formulations are kneaded in a conventional manner together with thickeners, for example alkali metal alginates or the like, and optionally further additives, for example fixation accelerants, wetting agents and oxidizing agents, to give print pastes.

The present invention also provides inks for digital textile printing by the ink jet process, said inks containing a dye mixture according to the present invention.

The inks of the present invention are preferably aqueous and contain dye mixtures of the present invention in amounts ranging for example from 0.1% to 50% by weight, preferably in amounts ranging from 1% to 30% by weight and more preferably in amounts ranging from 1% to 15% by weight based on the total weight of the ink.

They further contain more particularly from 0.1% to 20% by weight of a dispersant. Suitable dispersants are known to a person skilled in the art, are commercially available and include for example sulfonated or sulfomethylated lignins, condensation products of aromatic sulfonic acids and formaldehyde, condensation products of optionally substituted phenol and formaldehyde, polyacrylates and corresponding copolymers, modified polyurethanes and reaction products of alkylene oxides with alkylatable compounds, for example fatty alcohols, fatty amines, fatty acids, carboxamides and optionally substituted phenols.

The inks according to the present invention may further contain the customary additives, for example viscosity moderators to set viscosities in the range from 1.5 to 40.0 mPas in the temperature range from 20 to 50° C. Preferred inks have a viscosity in the range from 1.5 to 20 mPas and particularly preferred inks have a viscosity in the range from 1.5 to 15 mPas.

Suitable viscosity moderators are rheological additives, for example polyvinyl caprolactam, polyvinylpyrrolidone and also their copolymers, polyetherpolyol, associative thickeners, polyurea, sodium alginates, modified galactomannans, polyetherurea, polyurethane and nonionic cellulose ethers.

By way of further additions, the inks according to the present invention may contain surface-active substances to set surface tensions in the range from 20 to 65 mN/m, which are adapted as appropriate depending on the process used (thermal or piezo technology).

Suitable surface-active substances are for example surfactants of any kind, preferably nonionic surfactants, butyldiglycol and 1,2-hexanediol.

The inks may further contain customary additions, for example substances to inhibit fungal and bacterial growth in amounts from 0.01% to 1% by weight based on the total weight of the ink.

The inks according to the present invention are obtainable in a conventional manner by mixing the components in water.

The examples which follow serve to elucidate the invention without being restricted to these examples. Parts and percentages are by weight, unless otherwise stated. Parts by weight relate to parts by volume like the kilogram relates to the liter.

EXAMPLE 1 a) 50 parts of the dye (I-1)

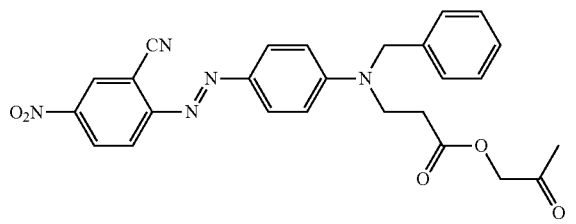

(I-1)

are mechanically mixed with 50 parts of the dye (II-1)

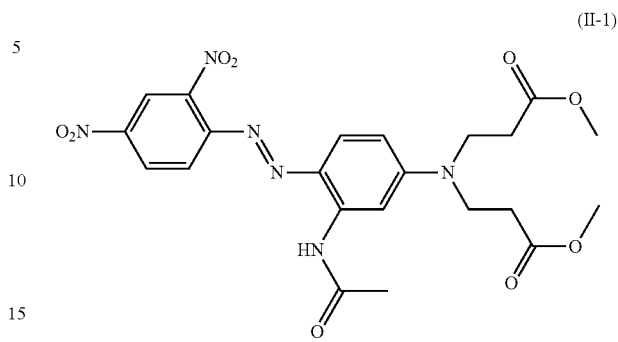

(II-1)

Then, the mixture is ground as a 40% aqueous suspension with 100 parts of a high temperature stable dispersant until the particle size (diameter) has reached the size magnitude of 0.1-5 micrometers.

This dispersion is standardized to a solid product containing 25% of the dye mixture and 70% dispersant, by adding 99.7 parts of a "cutting agent" and by drying in a spray dryer either in powder form.

b) 2 g of the dye mixture obtained as per a) are dispersed in 100 ml of water at 40-50° C. A dyebath is prepared from 11.5 ml of this aqueous dispersion, 57.5 ml of deionized water and 1.2 ml of buffering solution (pH 4.5) and entered with a 5 g piece of polyester. The dyebath is heated to 130° C. and maintained at 130° C. for 45 minutes in a Werner Mathis high temperature dyeing machine. After rinsing with water and reduction clearing, the polyester material has a ruby red hue having excellent wash fastnesses. A particularly interesting property of this mixture is the outstanding wash and contact fastness and the good sublimation fastness on polyester and polyester microfiber.

Example 1 is repeated in similar fashion to obtain the dye mixtures of examples 2 to 20 according to the invention and use them for dyeing polyester. The table which follows indicates the fraction of the respective dye in % by weight based on the total dye content. The indicated mixtures produce red dyeings having outstanding wash and contact fastnesses and also good sublimation fastness.

| Dye | Example | | | | | | | | | | | | | | | | | | | |
|---|---|---|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 | 18 | 19 | 20 |
| I-1 | 45 | 40 | 50 | 50 | 70 | 75 | 30 | 60 | 30 | 30 | | | | | | | | | |
| I-2 | | | | | | | | | | | 60 | 50 | 70 | 40 | 30 | 40 | 50 | 35 | 60 |
| II-1 | | 55 | | | | | | | 40 | | 40 | 50 | 60 | 60 | | | | | |

-continued

| Dye | Example | | | | | | | | | | | | | | | | | | |
|---|---|---|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 | 18 | 19 | 20 |
| II-2 | | | 50 | | | | | | 30 | | | | | | 70 | | | | |
| II-3 | | 60 | | | | | | | | | | | | | | | 50 | | |
| II-4 | | | | 50 | | | | | | | | | | | | 60 | | | |

-continued

| Dye | Example | | | | | | | | | | | | | | | | | | |
|---|---|---|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 | 18 | 19 | 20 |
| II-5 (structure) | | | | | 30 | | | | | | | | | | | | | | |
| II-6 (structure) | | | | | | 25 | | | | 70 | | | | | | | | | 20 |
| II-7 (structure) | | | | | | | 70 | | | | | | | 65 | | | | | |

II-5:

O₂N–C₆H₃(CN)–N=N–C₆H₃(NHC(O)CH₃)–N(CH₂C(O)OCH₃)₂

II-6:

O₂N–C₆H₂(CN)(Cl)–N=N–C₆H₃(NHC(O)CH₃)–N(CH₂C(O)OCH₃)₂

II-7:

O₂N–C₆H₃(OH)–N=N–C₆H₃(NHC(O)CH₃)–N(CH₂CH₂OC(O)CH₃)₂

-continued
| Dye | Example | | | | | | | | | | | | | | | | | | | |
|---|---|---|---|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 | 18 | 19 | 20 |
| | | | | | | 40 | | | | | | | 30 | | | | | | 20 |
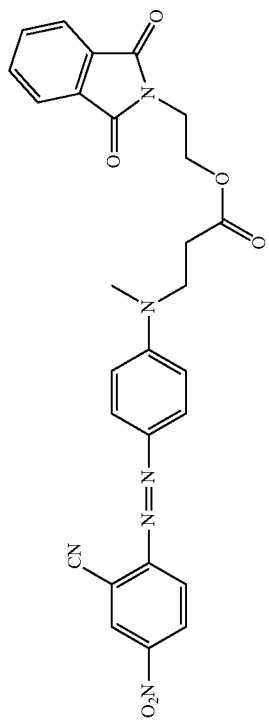
II-8

Further dye mixtures according to the present invention may contain the dyes of examples 21 to 29 and also be used for dyeing polyester. The table which follows indicates the fraction of the respective dye in % by weight based on the total dye content. The indicated mixtures produce red dyeings having outstanding wash and contact fastnesses and also good sublimation fastness.

Further dye mixtures according to the present invention may contain the dyes of examples 30 to 49 and also be used for dyeing polyester. The table which follows indicates the fraction of the respective dye in % by weight based on the total dye content. The indicated mixtures produce blue dyeings having outstanding wash and contact fastnesses and also good sublimation fastness.

| Dye | Example | | | | | | | | |
|---|---|---|---|---|---|---|---|---|---|
|  | 21 | 22 | 23 | 24 | 25 | 26 | 27 | 28 | 29 |
| I-3 | 40 |  | 50 |  | 70 |  |  |  |  |
| I-4 |  | 60 |  | 30 |  | 40 |  |  |  |
| I-5 |  |  |  |  |  |  | 30 | 30 | 30 |
| II-9 |  | 60 |  |  | 30 |  | 70 |  |  |
| II-10 |  |  |  | 50 |  | 60 |  | 70 |  |
| II-11 |  |  | 40 |  | 70 |  |  |  | 70 |

| Dye | | Example | | | | | | | | | | | | | | | | | | | |
|---|---|---|---|---|---|---|---|---|---|---|---|---|---|---|---|---|---|---|---|---|---|
| | | 30 | 31 | 32 | 33 | 34 | 35 | 36 | 37 | 38 | 39 | 40 | 41 | 42 | 43 | 44 | 45 | 46 | 47 | 48 | 49 |
| I-6 | (structure: 2,4-dinitrophenylazo, OMe, N(benzyl)(CH₂CH₂C(O)OCH₂C(O)CH₃), NHAc) | 40 | 70 | 60 | 50 | 30 | 30 | 45 | 55 | 30 | 50 | 70 | | | | | | | | | |
| I-7 | (structure: 2-bromo-4,6-dinitrophenylazo, OMe, N(benzyl)(CH₂CH₂C(O)OCH₂C(O)CH₃), NHAc) | | 60 | | | | | 45 | | | | | 60 | 60 | 60 | | | | | | |
| I-8 | (structure: 2-chloro-4,6-dinitrophenylazo, OMe, N(benzyl)(CH₂CH₂C(O)OCH₂C(O)CH₃), NHAc) | | | | | | | | | | | | | | | 20 | 50 | 40 | 60 | 65 | 60 |

-continued

| Dye | Example | | | | | | | | | | | | | | | | | | | |
|---|---|---|---|---|---|---|---|---|---|---|---|---|---|---|---|---|---|---|---|---|
| | 30 | 31 | 32 | 33 | 34 | 35 | 36 | 37 | 38 | 39 | 40 | 41 | 42 | 43 | 44 | 45 | 46 | 47 | 48 | 49 |
| II-12 | 60 | 40 | | | | | | | | | | | | | | | | | | |
| II-13 | | | | | | | 30 | | | | | | | | | | | | | |
| II-14 | | | | | | | | | | 40 | | | 20 | | | | | | | |

-continued

| Dye | Example | | | | | | | | | | | | | | | | | | | | |
|---|---|---|---|---|---|---|---|---|---|---|---|---|---|---|---|---|---|---|---|---|---|
| | 30 | 31 | 32 | 33 | 34 | 35 | 36 | 37 | 38 | 39 | 40 | 41 | 42 | 43 | 44 | 45 | 46 | 47 | 48 | 49 |
| II-15 | | | | | 50 | | | | | | 20 | | | | | | | | | |
| II-16 | | | | | | | | | 40 | | | | | | | | | | | |
| II-17 | | | | | | | | | | | | | | | 50 | | | 30 | | | 50 |

-continued

| Dye | Example | | | | | | | | | | | | | | | | | | | |
|---|---|---|---|---|---|---|---|---|---|---|---|---|---|---|---|---|---|---|---|---|
| | 30 | 31 | 32 | 33 | 34 | 35 | 36 | 37 | 38 | 39 | 40 | 41 | 42 | 43 | 44 | 45 | 46 | 47 | 48 | 49 |
| II-18 | 30 | | | | | | | | | | | | | | | | | | | |
| II-19 | | | | | | | 25 | | | | | | 40 | 20 | | | | | | |
| II-20 | | | | | | | | | | | | | | | | | 35 | | | |

-continued

| Example | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|
| Dye II-21 | | | | | | | | | | | 50 | | | | | | | | | 40 |
| Dye II-22 | | | | | | | | | | 70 | | | | | | 45 | | | | |
| Dye II-23 | | | | | | | | | | | | | | | | | 40 | | | |

-continued

| Dye | Example |  |  |  |  |  |  |  |  |  |  |  |  |  |  |  |  |  |  |  |
|---|---|---|---|---|---|---|---|---|---|---|---|---|---|---|---|---|---|---|---|---|
| | 30 | 31 | 32 | 33 | 34 | 35 | 36 | 37 | 38 | 39 | 40 | 41 | 42 | 43 | 44 | 45 | 46 | 47 | 48 | 49 |
| II-24 | | | | | | | | 55 | | | | | | | | | | | | |
| II-25 | | | | | | | | | | | | | | | | | 60 | | | |

In addition to those already mentioned, the dye mixtures according to the present invention may contain the dyes of examples 50 to 69 and also be used for dyeing polyester. The table which follows indicates the fraction of the respective dye in % by weight based on the total dye content. The indicated mixtures produce blue dyeings having outstanding wash and contact fastnesses and also good sublimation fastness.

| Dye | Example | | | | | | | | | | | | | | | | | | | |
|---|---|---|---|---|---|---|---|---|---|---|---|---|---|---|---|---|---|---|---|---|
| | 50 | 51 | 52 | 53 | 54 | 55 | 56 | 57 | 58 | 59 | 60 | 61 | 62 | 63 | 64 | 65 | 66 | 67 | 68 | 69 |
| I-6 | | | 80 | | | | 50 | 60 | 55 | 30 | 70 | 40 | 35 | 55 | | | | | | |
| I-7 | | | | 45 | | 70 | | | | | | | | | 50 | 60 | 50 | | 65 | 40 |
| I-8 | | | | | | | | | | | | | | | | | | 40 | | |

-continued

| Dye | Example | | | | | | | | | | | | | | | | | | | |
|---|---|---|---|---|---|---|---|---|---|---|---|---|---|---|---|---|---|---|---|---|
| | 50 | 51 | 52 | 53 | 54 | 55 | 56 | 57 | 58 | 59 | 60 | 61 | 62 | 63 | 64 | 65 | 66 | 67 | 68 | 69 |
| III-1 | | | 20 | | | 30 | | | | | | | | | | | | | | 35 |
| III-2 | | | | | | | | 50 | | | | | | | | | | | | |
| III-3 | | | | | | | | | 40 | | | | | | 50 | | | | | |
| III-4 | | | | | | | | | | 45 | | | | | | | 60 | | | |

-continued

| Dye | Example |||||||||||||||||||||
|---|---|---|---|---|---|---|---|---|---|---|---|---|---|---|---|---|---|---|---|---|
| | 50 | 51 | 52 | 53 | 54 | 55 | 56 | 57 | 58 | 59 | 60 | 61 | 62 | 63 | 64 | 65 | 66 | 67 | 68 | 69 |
| III-5 | | | | | | | | | | 70 | | | | | | | | | | | |
| III-6 | | | | | | | | | | | 30 | | | 40 | | | | | | |
| (third dye) | | | | | | | | | | | | 60 | | | | | | | | | 60 |

-continued

| Dye | Example | | | | | | | | | | | | | | | | | | | | |
|---|---|---|---|---|---|---|---|---|---|---|---|---|---|---|---|---|---|---|---|---|---|
| | 50 | 51 | 52 | 53 | 54 | 55 | 56 | 57 | 58 | 59 | 60 | 61 | 62 | 63 | 64 | 65 | 66 | 67 | 68 | 69 |
| III-7 | | | | | | | | | | | | | 65 | | | | | | | | |
| III-8 | | | | | | | | | | | | | | | 45 | 50 | | | | | |
| III-9 | | | | | | | | | | | | | | | | | | | | | |

Further dye mixtures according to the present invention contain the dyes of examples 70 to 89 and may be used for dyeing polyester. The table which follows indicates the fraction of the respective dye in % by weight based on the total dye content. The indicated mixtures produce dyeings having outstanding wash and contact fastnesses and also good sublimation fastness.

| Dye | Examples | | | | | | | | | | | | | | | | | | | |
|---|---|---|---|---|---|---|---|---|---|---|---|---|---|---|---|---|---|---|---|---|
| | 70 | 71 | 72 | 73 | 74 | 75 | 76 | 77 | 78 | 79 | 80 | 81 | 82 | 83 | 84 | 85 | 86 | 87 | 88 | 89 |
| I-6 | 60 | | | | | | | | | | 70 | | 70 | | | | 50 | | | |
| I-9 | | | 60 | | | | | | | | | | 70 | | | | | | | | |
| I-10 | | | | | 60 | | | | | | | | | 70 | | | | | 50 | 50 | 60 |

-continued

| Dye | Examples | | | | | | | | | | | | | | | | | | | |
|---|---|---|---|---|---|---|---|---|---|---|---|---|---|---|---|---|---|---|---|---|
| | 70 | 71 | 72 | 73 | 74 | 75 | 76 | 77 | 78 | 79 | 80 | 81 | 82 | 83 | 84 | 85 | 86 | 87 | 88 | 89 |
| I-12 | 60 | | | | | | | | | | | | | | 70 | | | | | |
| I-13 | | | | | 60 | | | | | | | | | | | 50 | | | | |
| I-14 | | | | | | | 60 | | | | | | | | | | | | | |

-continued

| Dye | Examples |||||||||||||||||||||
|---|---|---|---|---|---|---|---|---|---|---|---|---|---|---|---|---|---|---|---|---|
| | 70 | 71 | 72 | 73 | 74 | 75 | 76 | 77 | 78 | 79 | 80 | 81 | 82 | 83 | 84 | 85 | 86 | 87 | 88 | 89 |
| I-15 | | | | | | 60 | | | | | | | | | | | | | | | |
| I-16 | | | | | | | | | | | | 60 | | | | | | | | | |
| I-17 | | | | | | | | | | | | | | | | | 60 | | | | |

-continued

| Dye | Examples | | | | | | | | | | | | | | | | | | | |
|---|---|---|---|---|---|---|---|---|---|---|---|---|---|---|---|---|---|---|---|---|
| | 70 | 71 | 72 | 73 | 74 | 75 | 76 | 77 | 78 | 79 | 80 | 81 | 82 | 83 | 84 | 85 | 86 | 87 | 88 | 89 |
| I-18 | 40 | | | 20 | | 40 | | | | | 60 | | | | | | | | | |
| I-19 | | | | | | | | | | | 40 | | | | | 50 | | | | |
| II-9 | 40 | | | 20 | | 40 | | | | | 40 | | | | 30 | | | 25 | | |

-continued

| | Examples | | | | | | | | | | | | | | | | | | | |
|---|---|---|---|---|---|---|---|---|---|---|---|---|---|---|---|---|---|---|---|---|
| Dye | 70 | 71 | 72 | 73 | 74 | 75 | 76 | 77 | 78 | 79 | 80 | 81 | 82 | 83 | 84 | 85 | 86 | 87 | 88 | 89 |
| II-10 | 40 | 20 | | | | | 40 | | 40 | | | | | | | | | 25 | | |
| II-12 | | | | | 40 | | | | | | | | 30 | 30 | | | | | 50 | |
| III-1 | | | | | | | | 40 | | 40 | | | | | | | | | | 50 |

EXAMPLE 90

A textile fabric consisting of polyester is pad-mangled with a liquor consisting of 50 g/l of an 8% sodium alginate solution, 100 g/l of an 8-12% carob flour ether solution and g/l of 5 monosodium phosphate in water and then dried. The wet pickup is 70%. The textile thus pretreated is printed with an aqueous ink prepared in accordance with the procedure described above and containing

- 3.5% of the dye of example 1,
- 2.5% of Disperbyk 190 dispersant,
- 30% of 1,5-pentanediol,
- 5% of diethylene glycol monomethyl ether,
- 0.01% of Mergal K9N biocide and
- 58.99% of water using a drop-on-demand (piezo) inkjet print head. The print is fully dried. Fixing is effected by means of superheated steam at 175° C. for 7 minutes. The print is subsequently subjected to an alkaline reduction clear, rinsed warm and then dried.

What is claimed is:

1. A dye mixture comprises a dye of the formula (I-1) and (II-1)

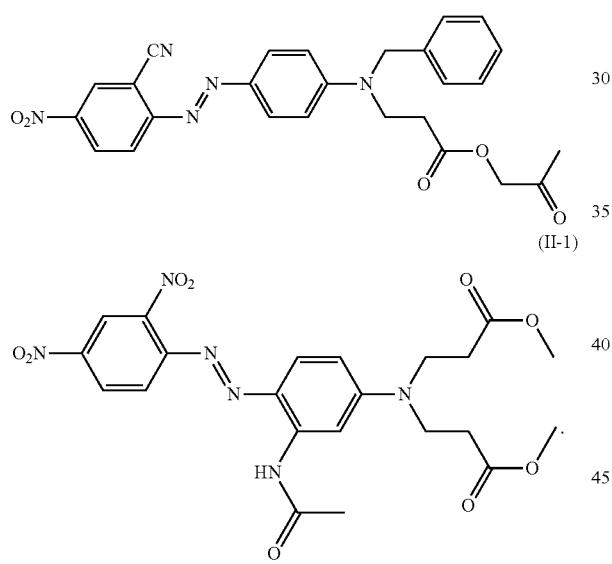

2. The dye mixture as claimed in claim 1, further containing at least one dye of formula (III)

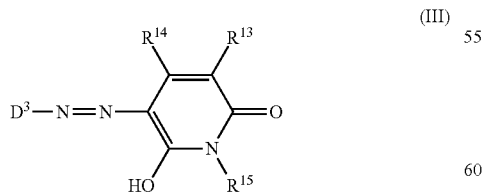

where
$R^{13}$ is hydrogen, cyano or carboxamido,
$R^{14}$ is methyl, ethyl or phenyl,
$R^{15}$ is optionally substituted $(C_1-C_6)$-alkyl or optionally substituted oxygen-interrupted $(C_2-C_6)$-alkyl, and
$D^3$ represents the residue of a diazo component.

3. The dye mixture as claimed in claim 2, where
$R^{13}$ is cyano,
$R^{14}$ is ethyl or methyl, and
$R^{15}$ is methyl, ethyl, n-propyl, sec-propyl, n-butyl, sec-butyl, 1-ethylpentyl, methoxymethyl, methoxyethyl, ethoxymethyl, ethoxyethyl, $-C_yH_{2y}-COO-CH_2-CO-C_6H_5$ where y=1, 2, 3 or 4 or $-C_{y^*}H_{2y^*}-O-(C_1-C_4$-alkyl) where y*=1, 2, 3 or 4.

4. The dye mixture as claimed in claim 1, further containing at least one dye of formula (IIIa)

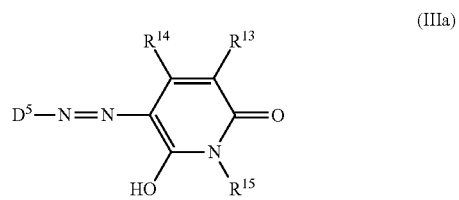

where
$R^{13}$ is hydrogen, cyano or carboxamido,
$R^{14}$ is methyl, ethyl or phenyl,
$R^{15}$ is optionally substituted $(C_1-C_6)$-alkyl or optionally substituted oxygen-interrupted $(C_2-C_6)$-alkyl, and
$D^5$ is a group of formula (IVa)

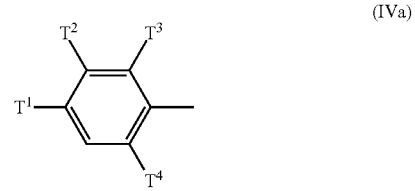

where
$T^1$ and $T^2$ are each independently hydrogen, $(C_1-C_6)$-alkyl, $(C_1-C_4)$-alkoxy, $-SO_2(C_1-C_6)$-alkyl, $-SO_2$-aryl, cyano, halogen or nitro, or $T^1$ and $T^2$ combine to form the moiety $-CONT^{14}CO-$,
$T^{14}$ is hydrogen or $(C_1-C_6)$-alkyl, and
$T^3$ and $T^4$ are each independently hydrogen, halogen, trifluoromethyl, cyano, $-SCN$, $-SO_2CH_3$ or nitro, provided at least one of $T^1$, $T^2$, $T^3$ and $T^4$ is not hydrogen.

5. The dye mixture as claimed in claim 1, further containing at least one dye of formula (IIIb)

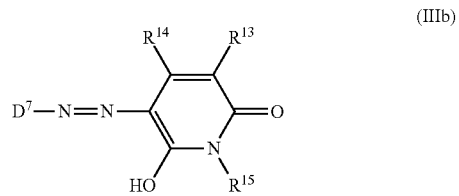

where
$R^{13}$ is hydrogen, cyano or carboxamido,
$R^{14}$ is methyl, ethyl or phenyl,
$R^{15}$ is optionally substituted $(C_1-C_6)$-alkyl or optionally substituted oxygen-interrupted $(C_2-C_6)$-alkyl, and $D^7$ is a group of formula (IVa),

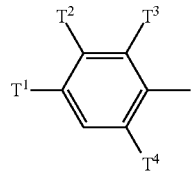
(IVa)

where $T^1$ is nitro or —OCH$_3$, $T^2$ are each independently hydrogen, (C$_1$-C$_6$)-alkyl, (C$_1$-C$_4$)-alkoxy, —SO$_2$(C$_1$-C$_6$)-alkyl, —SO$_2$-aryl, cyano, halogen or nitro, and $T^3$ and $T^4$ are each independently hydrogen, halogen, trifluoromethyl, cyano, —SCN, —SO$_2$CH$_3$ or nitro.

6. The dye mixture as claimed in claim 1, further containing at least one dye of formula (IIIc)

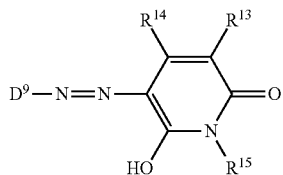
(IIIc)

where $R^{13}$ is hydrogen, cyano or carboxamido, $R^{14}$ is methyl, ethyl or phenyl, $R^{15}$ is optionally substituted (C$_1$-C$_6$)-alkyl, and $D^9$ is a group of formula (IVa),

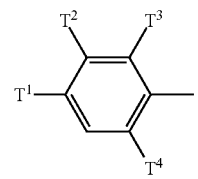
(IVa)

where $T^1$ is nitro or —OCH$_3$, $T^2$ is hydrogen, $T^3$ is hydrogen, chlorine, bromine, nitro or cyano or hydroxyl, and $T^4$ is hydrogen, chlorine, bromine, nitro or cyano.

7. A process for dyeing and printing a hydrophobic material which comprises utilizing the dye mixture as claimed in claim 1 with the material.

8. An ink for digital textile printing by the ink jet process, comprising the dye mixture as claimed in claim 1.

\* \* \* \* \*